July 1, 1930.  E. G. McCAULEY  1,769,801
PROPELLER
Filed Nov. 15, 1924
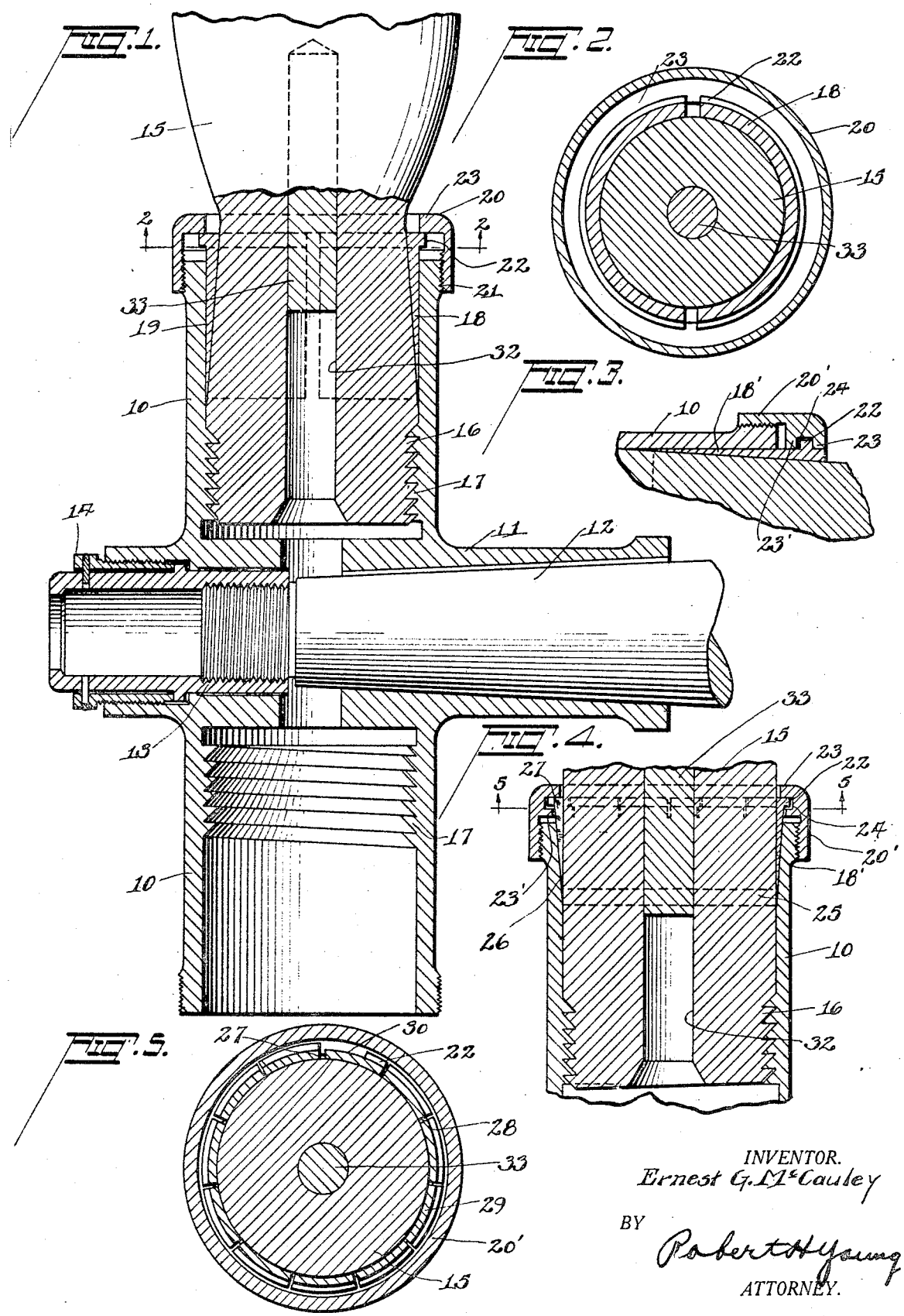
INVENTOR.
Ernest G. McCauley
BY Robert H Young
ATTORNEY.

Patented July 1, 1930

1,769,801

UNITED STATES PATENT OFFICE

ERNEST G. McCAULEY, OF DAYTON, OHIO, ASSIGNOR TO THE HAMILTON STANDARD PROPELLER CORPORATION, A CORPORATION OF PENNSYLVANIA

PROPELLER

Application filed November 15, 1924. Serial No. 750,149.

This invention relates to propellers for aircraft generally, and has particular reference to provisions for eliminating destructive vibration of the blades in operation.

The principal object of the invention consists in providing wedging means in the propeller hub serving to provide a solid or rigid bearing at the time the blade is assembled in the hub which will secure the blade tightly, and at the same time will not loosen up after the blade is in service, and enable destructive vibration.

Another object of the invention is to provide means in connection with the wedging means for loosening and withdrawing the latter in the disassembling of the propeller blades.

In the drawing illustrating my invention,

Fig. 1 is a central longitudinal section through the propeller hub showing the improvements of my invention directed toward eliminating vibration.

Fig. 2 is a cross sectional detail on the line 2—2 of Fig. 1 looking in the direction indicated by the arrows.

Fig. 3 is a fragmentary sectional detail illustrating a modified form of wedge having means enabling the easy removal thereof from the propeller hub.

Fig. 4 is a fragmentary sectional detail of a portion of a propeller hub of a slightly modified form utilizing a different form of wedge operating after the fashion of the wedge shown in Fig. 3, but constructed of a single piece instead of the two-piece wedge appearing both in Figs. 1 and 3.

Fig. 5 is a cross sectional detail taken on the line 5—5 of Fig. 4 looking in the direction of the small arrows.

Throughout the figures the same or similar reference numerals apply to corresponding parts.

The propeller hub comprises a pair of diametrically opposed blade sockets 10, formed preferably integral with a sleeve 11 fitting over and keyed upon the tapered end of the engine crankshaft 12. The sleeve 11 is secured to the shaft 12 by a nut 13 threading on the end of the shaft 12, the nut 13 being locked by a nut 14 threading in the outer end of the sleeve 11 and pinning as indicated to the nut 13. Any suitable form of hub mounting may be utilized in connection with my invention.

The sockets 10 constitute blade holders for blades 15 extending diametrically in opposite directions from the propeller hub. The blades 15 are threaded at their inner ends as shown at 16 to thread into the internally threaded portion 17 at the inner ends of the sockets 10. The threads assume the thrust incident to centrifugal action in the operation of the propeller. Beyond the threaded portions 16 and 17 of the blades and sockets the blades are provided with a solid or rigid bearing in the outer ends of the sockets 10 by two-piece cylindrical wedges 18. The latter are cylindrical on their outer surfaces and have an outwardly tapering bore fitting the conversely tapered shanks 19 of the blades 15. The wedges 18 are backed up by gland nuts 20 threading on the outer ends of the sockets 10 as shown at 21. The wedges 18 have annular projections 22 engaged by the annular lips 23 of the gland nuts 20 to drive the wedges inwardly in the sockets. Where no wedges were provided and the ends of the blades were cylindrical in form, and moved with an easy fit in the blade sockets to enable the threading of the blades in the sockets, it was found that the vibration set up in the operation of the propeller increased the tolerance, until the blade was free to vibrate considerably, so much so that blades frequently broke off at the hub. Where a wedging means is provided such as that herein shown, or a wedging means of the character shown in my co-pending application above referred to, the blades have a solid bearing beyond the threaded portions and destructive vibration is eliminated. In the construction illustrated, the wedging means serves additionally to fasten the blade in its adjusted position, so that the pitch will not vary in operation.

The wedges 18 are driven so tightly into the sockets between the socket wall and the blade that it becomes almost impossible to extract the same, when it is necessary to remove or adjust the blade. This is so, particularly because of the slight extent to which the wedges project beyond the ends of the sockets furnishing no purchase for extracting the same. This difficulty is especially pronounced where the wedges have plain outer surfaces so that no shoulders are afforded against which a tool might be engaged to loosen or remove the wedge. In Fig. 3 I have illustrated a wedge 18 of practically the same form as that shown in Fig. 1 but providing in connection with the annular projection 22 thereof, a gland nut 20' having an outer annular lip 23 and an inner annular lip 23'. On opposite sides of the annular projection 22 the lip 23 serves in the driving of the wedge into the socket in the tightening of the nut 20', and the lip 23' serves to restrict the wedge in the loosening of the nut. The halves of the wedge are movable toward each other sufficiently at the most reduced portion of the blade shank, to permit the entrance of the annular projection 22 into the annular groove 24 between the lips 23 and 23'. It is obvious that the loosening of the nut produces the loosening of the wedge so that an adjustment of the plate may be made. In case it is desired to remove the plate, the loosening of the nut with the wedge is alternated with unthreading of the plate, until the nut is entirely unthreaded. With the wedge loosened the blade is free to be unthreaded and removed from the socket.

In Figs. 4 and 5 I have illustrated a further modification wherein a blade 15 having a cylindrical shank 25 is received in a socket 10, the outer end of which has its bore tapering inwardly as shown at 26. A wedge 18' has a cylindrical bore to fit the blade and is tapered on its exterior to conform to the tapering of the socket 10. The wedge 18' as shown in Fig. 5 is in one piece and split longitudinally as shown at 27, to permit the compression of the wedge to a smaller diameter so that the annular projection 22 at the outer end of the wedge may be engaged in the annular groove 24 of the gland nut 20'. So far as the operation of this wedge is concerned, it is similar to the wedge 18 and is driven into the socket by the annular lip 23 in the tightening of the nut 20', and is loosened and withdrawn from the socket by the lip 23' in the loosening of the nut 20'. The wedging action is secured in this case substantially as in the instance above described, and a solid or rigid bearing is provided for the blade beyond the threaded inner end 16 thereof. The wedge, for easy entrance into the nut 20' has saw-cuts 28 preferably at regularly spaced intervals in the outer end of the wedge, to provide a plurality of tongues 29 of an odd number for a purpose presently to be described. The annular projection 22 is thus divided into a plurality of lugs one for each tongue 29, so that the compression of the wedge to a smaller diameter is not tedious or impractical by having to compress a continuous annular projection. One of the lugs adjacent the slot 27 is partially or entirely removed as shown at 30 to facilitate the overlapping of this portion of the free ends of the wedge in the compressing operation when the wedge is assembled in the nut 20'. By making an odd number of saw cuts to provide an odd number of tongues 29, there is avoided the likelihood of the wedge taking a set at the point diametrically opposite the slot 27 when the wedge is compressed, so the free ends thereof overlap as above described. After the compression of the wedge and its release, it springs back to its normal size with the annular projection 22 entered in the annular groove 24 of the nut 20'. Since the wedge has a cylindrical bore it is free to pass over the cylindrical end of the blade.

As is well understood in the art, the sockets and blades should be symmetrical as a slight difference in weight between the several sockets and blades would produce destructive strains at the high speeds at which the propeller is driven. It is nearly impossible to make the sockets and blades of exactly the same weight and hence provision is made for increasing the weight of a socket or blade. A convenient means for weighting one of the sockets and blades consists in drilling a hole 32 axially of the stem of the blade for the reception of a counterweight. The weight consists preferably of a plug of soft metal, as lead 33, which may be poured in a liquid state into the hole 32. Some of the lead is then removed after it has solidified by a drill so that the blade may exactly balance a standard blade.

I claim:

1. In a propeller, a hub having a blade socket, a blade therefor, threaded portions on the blade end interfitting similar portions within said blade socket, wedge means intermediate the blade and blade socket to hold said blade against vibration and means associated with said first named means for increasing or decreasing the wedge action of said wedge means.

2. In a propeller, the combination with a hub having a blade socket, of a blade therefor, threaded parts on the blade end interfitting similar parts in the blade socket, means for securing said blade in said socket and means providing a wedging action to hold said blade in said socket when said securing means is tightened, said means constructed and arranged to provide a positive release in the loosening of said securing means.

3. In a propeller, the combination with a hub having a blade socket, a blade therefor, threaded portions on the blade end interfitting similar portions within said blade socket, a wedge between said blade and blade socket and means for securing said blade in said socket, said means constructed and arranged to provide in tightening to drive the wedge tight and in loosening to loosen the wedge.

4. In a propeller, the combination with a hub having a blade socket of a blade therefor, threaded portions on the blade end interfitting similar portions within said socket, a nut threading on said socket and a wedge intermediate said blade and socket engaged by said nut in the tightening and loosening thereof to move the wedge in and out of said socket.

5. In a propeller, the combination with a hub having a blade socket, a blade therefor, threaded portions on the blade end interfitting similar portions within said blade socket, a member threading on said socket, a wedge member between said blade and said socket, a groove in one of said members and a projection in the other of said members engaging in said groove whereby said wedge is moved in and out of said socket in the threading and unthreading of said member on said socket.

6. In a propeller, the combination with a hub having a blade socket, a blade therefor, threaded portions on the blade end interfitting similar portions within said blade socket, a gland nut threading on said socket having an internal groove therein and a wedge between said blade and socket having a lug entering said groove.

7. In a propeller, the combination with a hub having a blade socket, a blade therefor, threaded portions on the blade end interfitting similar portions within said blade socket, a nut threading on said socket and having an annular groove therein and a longitudinally split wedge adjacent said threaded portions on said blade end and intermediate said blade and blade socket, said wedge having an annular projection to enter said annular groove in said nut whereby the overall diameter thereof may be reduced sufficiently to enter the annular projection within said annular groove.

8. In a propeller, a hub having a blade socket, a blade therefor, threaded portions on the blade end interfitting similar portions within said blade socket, a nut threading on said socket and having an annular groove therein, a wedge about said blade and within said socket, said wedge being split longitudinally to permit its compression to a smaller diameter whereby to permit its entry within said nut and an annular projection on said wedge at the outer end thereof to enter said annular groove provided in said nut, said annular projection terminating short of the longitudinal slot where said wedge is split to permit the overlapping of the free ends of said wedge in compressing the same.

In testimony whereof I affix my signature.

ERNEST G. McCAULEY.